Dec. 30, 1969     S. KAHANICK     3,486,485

CAT CLAWING PAD

Filed Sept. 21, 1967

INVENTOR.
Stephen Kahanick

# United States Patent Office 3,486,485
Patented Dec. 30, 1969

3,486,485
CAT CLAWING PAD
Stephen Kahanick, 11 Elm St.,
Binghamton, N.Y. 13905
Filed Sept. 21, 1967, Ser. No. 669,482
Int. Cl. A01k 29/00
U.S. Cl. 119—1                3 Claims

ABSTRACT OF THE DISCLOSURE

A cat clawing pad which a cat and similar clawing animals can scratch and claw, thus avoiding damage to furniture, curtains and the like. It is formed of a major casing with open top chamber into which a large number of corrugated cardboard laminations are stacked edgewise, with one edge upwardly, so that the cat can mount the casing and claw the cardboard strips as long as it wants to. Chemical means such as catnip used to impregnate the cardboard strips to attract the cats to the cat clawing pad may be used.

---

This invention relates to improvements in cat clawing pads and the like.

An object of the invention is to provide a novel and improved device for use with pets such as cats and other animals, which they can claw for exercise and to satisfy their clawing instincts.

Another object of the invention is to provide a novel and improved device including major housing means which is formed with an upwardly open chamber, with a large number of strips of material disposed in the chamber so as to pack the same, the strips being formed of material which is clawable by cats and other similar animals and pets, while yieldably resisting their clawing efforts, so as to simulate other objects which they might desire to claw.

A further object of the invention is to provide a novel and improved cat clawing pad device in which there is a major housing with a bottom wall, side walls and an upwardly open chamber, the chamber being of substantial depth, with a number of lamination strips tightly packed edgewise therein, with one edge of each lamination strip at the upper edge of the main chamber so as to provide a relatively level surface formed of such lamination strips, a chemical or other material such as catnip which cats like being either placed upon the laminations, or impregnated therein, so that they will be attracted thereto, and will claw the strips to try to reach all the catnip.

Still another object of the invention is to provide a novel and improved cat clawing pad device which is simple in design, formed of relatively few parts which may be made by mass production, and wherein the filler strips for the main chamber are made of relatively inexpensive or scrap material such as laminated cardboard, and hence easily replaceable as needed.

Still a further object of the invention is to provide a novel and improved cat clawing pad device which is attractive in appearance, and may be stood on end to look like a piece of furniture when not in use.

These and other objects and advantages of the invention will become apparent from the following description of a preferred embodiment thereof, as illustrated in the accompanying drawings, forming a part hereof, and in which.

A major problem for owners of pets, especially cats and similar clawed animals is to protect their furniture, rugs, curtains and other items from damage from the animals. With cats especially, there seems to be a natural instinct which requires them to claw objects which are at hand, and this instinct is so overpowering that it is difficult if not impossible to control. This is so, not only with mature cats, but also with growing kittens, and serious damage results when they claw stuffed furniture, such as sofas, chairs, bedding, and also rugs and curtains.

The present invention provides a solution to this problem, by making available to the cat or similar clawed animal, a device which they can claw as much as they wish, and at any time, without damage to any furniture, and it is made of simple rugged construction, with an impregnant such as catnip to attract them thereto.

In order to understand clearly the nature of the invention, and the best means for carrying it out, reference may be had to the drawings, in which like numerals denote similar parts throughout the several views.

Figure 1:
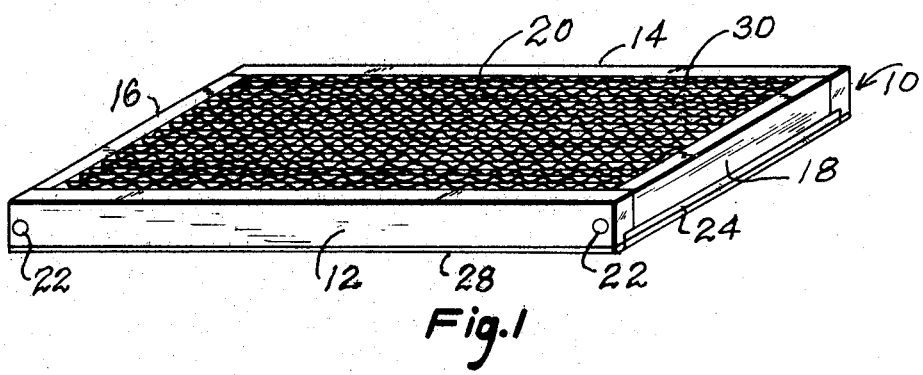
FIGURE 1 is a perspective view of a cat clawing pad according to the invention, in position ready for use by the cat.
Figure 3:
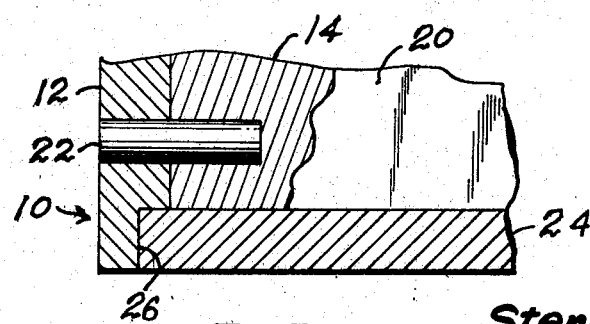
FIGURE 3 is an enlarged fragmentary elevational view of the sectional end portion of the device shown in FIGURE 2, but with the lamination fillers removed.

As shown, there is a main housing generally indicated at 10, with front and rear wall members 12 and 14, and connected at their edges to the left and right end wall members 16 and 18 respectively, to form a main chamber 20. As seen in FIGURES 1 and 3, dowels 22 may be employed for further strengthening the jointing of the wall members together, although other well known methods may also be used, such as nailing, screwing, and the like, and also glueing.

Figure 2:
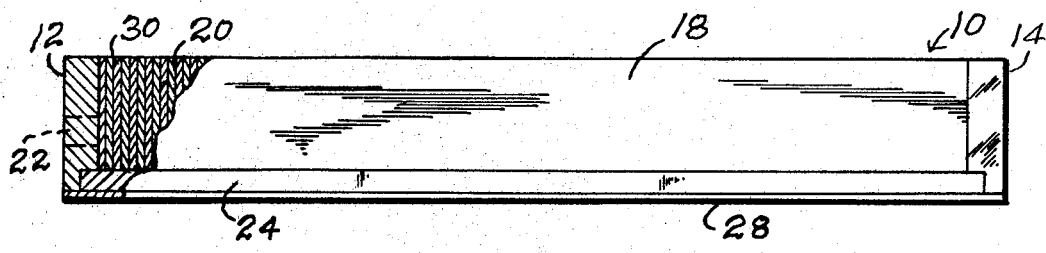
FIGURE 2 is an enlarged right end elevational view of the cat clawing pad of FIGURE 1, the view being partly broken out to show the interior construction.

The main chamber 20 is closed at the bottom by means of a floor wall member 24, which may be fitted into the recesses 26 formed in the lower edges of the four wall members, as seen in FIGURES 2 and 3, and may be secured therein by suitable fastening means, such as nailing, screws, or by adhesive glueing. Tongue and groove jointing may also be employed instead of the butt joint shown in FIGURE 3. A bottom sheet member 28 may also be used to cover the entire bottom of the device, and this may be of lightweight sheet material, such as plastic, plywood, or metal such as aluminum or the like secured thereto by suitable fastening means or glueing.

It is seen that the main chamber 20 is upwardly open, and disposed therewithin are a large number of upwardly edgewise lamination members 30, which are mutually parallel and tightly stacked as shown in FIGURES 1 and 2 in sandwich form to completely fill the main chamber 20. Their combined upper edges thus form the clawing surface for the cats. These lamination members form a scratchable clawable major body, and when the device is placed on the floor, the cat can mount the housing, and claw the clawable body to its heart's content. In order to make for relative inexpensiveness, it is preferred to make the laminations 30 of fibrous corrugated material, such as cardboard, and the like, which can be made up of discarded cardboard cartons, and packing cases, by merely cutting them into strips of suitable size and packing them into the main chamber. In order to attract cats and kittens to the cat clawing pad, I prefer to sprinkle it with a material which is very attractive to cats, such as catnip and it is well known that cats will be attracted thereto. With the catnip or other impregnant sprinkled upon and between the laminations, the cats will make every effort to reach the catnip, and will learn to claw the pad device. Where several cats or kittens are in the house, more than one pad device may be provided for them.

According to a modified form of the invention, the cardboard strips may also be stacked one above the other instead of edgewise, but is found that the edgewise method is more durable and effective. The walls and floor of the device may be made of wood or other material, including metal or plastics, the plastics being high-impact plastics which will not break on being dropped. The device may be finished to resemble wood furniture, and when not in use, may be stood on end to resemble some odd piece of furnishing. While the laminations may be wedged in tightly, it may be of advantage to adhesively secure them together at their lower edges.

Although I have described a preferred form of the invention in specific terms, it is understood that this is by way of example only, and that various changes may be made in size, shape, materials and arrangement without departing from the spirit and scope of the invention.

What I now claim is:

1. A clawing device for clawed animals, comprising main housing means, wall means carried by said main housing means and constructed and arranged for defining a main chamber means, said wall means comprising left and right end walls mutually spaced from each other, front and rear walls mutually spaced from each other and respectively secured to said left and right end walls to define therebetween said main chamber means, floor means closing said main chamber means at the bottom, said floor means comprising a floor wall extending over the bottom portion of said main chamber means and secured to said walls for closing said main chamber means at the bottom, said main chamber means being upwardly open, a bottom plate extending over the bottom of said end and side walls and said bottom wall and secured thereto to form a wearing surface therebelow, clawable mass means disposed in said main chamber means and accessible from the upper portion of said main chamber means for being clawed by an animal and the like, said clawable mass means comprising a plurality of sheets of fibrous material formed of corrugated paperboard and the like, disposed in said main chamber means and completely filling the same, said sheets being vertically stacked therein in side by side contact with one edge of each sheet facing upwardly out of said main chamber means, so as to form a clawable upper surface which is mountable by a cat and like animals for being clawed, and cat attractable material disposed on and in said sheets of fibrous material, in the nature of catnip and the like, for attracting cats thereto, and causing them to claw the same in searching for said cat-attractable material.

2. The construction according to claim 1, and wherein said walls and floor are made of plastic material.

3. The construction according to claim 1, and wherein said walls and floor are made of wood material.

References Cited

UNITED STATES PATENTS

| | | | |
|---|---|---|---|
| 1,942,287 | 1/1934 | Heitz | 154—43 |
| 2,894,487 | 7/1959 | Goldson | 119—1 |
| 2,971,493 | 2/1961 | Robb | 119—1 |
| 2,997,019 | 8/1961 | Bryson | 119—1 |
| 3,085,551 | 4/1963 | Helmer | 119—1 |
| 3,173,398 | 3/1965 | Raymond | 119—1 |

ALDRICH F. MEDBERY, Primary Examiner